(12) United States Patent
Shimizu et al.

(10) Patent No.: US 6,823,960 B2
(45) Date of Patent: Nov. 30, 2004

(54) ENGINE MOUNT FOR SMALL VEHICLE (75) Inventors: Katsuhisa Shimizu, Iwata (JP); Kazuhiko Izumi, Iwata (JP)

(73) Assignees: Yamaha Hatsudoki (JP); Kabushiki Kaisha (JP)

( * ) Notice: Subject to any disclaimer, the term of this patent is extended or adjusted under 35 U.S.C. 154(b) by 3 days.

(21) Appl. No.: 10/119,439

(22) Filed: Apr. 9, 2002

(65) Prior Publication Data
US 2002/0144852 A1 Oct. 10, 2002

(30) Foreign Application Priority Data
Apr. 9, 2001 (JP) ........................................ 2001-109379

(51) Int. Cl.⁷ ................................................ B60K 5/12
(52) U.S. Cl. ...................... 180/292; 180/908; 180/228; 248/635; 267/141; 267/140.5
(58) Field of Search ................. 180/300, 291, 180/292, 312, 295, 299, 908, 902, 228; 248/580, 618, 634, 635; 267/141, 140.5, 153

(56) References Cited

U.S. PATENT DOCUMENTS

| | | | |
|---|---|---|---|
| 3,811,528 A | | 5/1974 | Hooper |
| 3,825,090 A | * | 7/1974 | Runkle et al. ............... 180/300 |
| 3,903,738 A | * | 9/1975 | Malchow .................... 180/300 |
| 4,262,889 A | | 4/1981 | Moore |
| 4,323,135 A | | 4/1982 | Tominaga et al. |
| 4,412,597 A | * | 11/1983 | Aiba .......................... 180/300 |
| 4,418,898 A | * | 12/1983 | Atsumi et al. ............. 267/63 R |
| 4,420,060 A | * | 12/1983 | Kakimoto ................... 180/300 |
| 4,465,157 A | | 8/1984 | Onishi et al. |
| 4,487,285 A | * | 12/1984 | Tomita et al. ............... 180/228 |
| 4,537,275 A | * | 8/1985 | Kimura et al. .............. 180/300 |
| 4,666,015 A | * | 5/1987 | Matsuda et al. ............ 180/233 |
| 4,714,126 A | * | 12/1987 | Shinozaki et al. .......... 180/233 |
| 4,725,019 A | | 2/1988 | White |
| 5,078,369 A | * | 1/1992 | Pascal et al. ............ 267/140.1 |
| 5,094,425 A | * | 3/1992 | Stephens .................... 248/605 |
| 5,303,896 A | | 4/1994 | Sterka |
| 5,740,876 A | * | 4/1998 | Shimose et al. ............ 180/232 |
| 5,967,251 A | * | 10/1999 | Turl et al. ................... 180/297 |
| 5,992,555 A | * | 11/1999 | Sakamoto et al. .......... 180/300 |
| 6,053,272 A | * | 4/2000 | Koyanagi et al. ........... 180/299 |
| 6,085,858 A | * | 7/2000 | Wakana et al. ............. 180/300 |
| 6,155,372 A | * | 12/2000 | Hirasaka ..................... 180/297 |
| 6,296,073 B1 | * | 10/2001 | Rioux et al. ................ 180/292 |
| 6,435,489 B1 | * | 8/2002 | Rice et al. ................ 267/140.5 |

FOREIGN PATENT DOCUMENTS

JP           55-39815        3/1980

* cited by examiner

*Primary Examiner*—Bryan Fischmann
*Assistant Examiner*—Jeff Restifo
(74) *Attorney, Agent, or Firm*—Knobbe Martens Olson & Bear LLP (57) ABSTRACT

A small vehicle has an engine mounted to a frame assembly. The engine is mounted by a plurality of engine mounts. The engine mounts are seven times stiffer in compression and tension than in shear. The engine mounts have a block of resilient material that separates a pair of plates. The block can be any shape but a rectangular parallelepiped is preferred. The engine mounts are mounted on cylinders defined with a center axis that extends through a center of gravity of the engine in a direction parallel to an axis about which the crankshaft rotates.

26 Claims, 5 Drawing Sheets

ENGINE MOUNT FOR SMALL VEHICLE

RELATED APPLICATIONS

This application is related to Japanese Patent Application No. 2001-109,379, filed Apr. 9, 2001, which application is hereby incorporated by reference in its entirety.

BACKGROUND OF THE INVENTION

1. Field of the Invention

The present invention generally relates to engine mounts used on small vehicles. More particularly, the present invention relates to an engine mounting arrangement that improves the rigidity of the connection between the engine and the vehicle while reducing the transmission of vibrations between the engine and the vehicle.

2. Description of the Related Art

All terrain vehicles are a smaller type of vehicle that generally are used for both recreation and utilitarian purposes. In either application, the vehicles are frequently driven over rough terrain in areas in which roads do not exist. As such, operators of the vehicles are subject to a variety of jolts and impacts incurred during operation.

In many all terrain vehicles, four wheels are suspended from a frame assembly. These four wheels are connected to an engine such that the vehicle can be driven in two-wheel or four-wheel drive modes. In some all terrain vehicles, the wheels and the engine are coupled by a shaft drive assembly. In other all terrain vehicles, the wheels and the engine are coupled by a flexible loop, such as a drive belt or chain.

During operation, the engine and the drive train are subject to a variety of forces. For instance, during rapid acceleration of the engine, the rapid increase in crankshaft speed causes the balance of the engine to produce a reaction force. The reaction force is counter to the direction of crankshaft rotation. In addition, simple running of the engine causes a variety of vibrations, as is known in the art.

To counter the reaction force, engine mounts can be made of a stiff material such that the forces created during rapid speed increases are adequately resisted by the engine mounts. Such a construction reduces movement of the engine relative to the frame; however, such a construction increases the amount of vibrations transmitted to the frame. It has been found that movement of the engine resulting from reaction forces tends to rotate the engine about the crankshaft axis while operation of the vehicle and the engine result in oscillations about axes normal to the crankshaft axis.

Various attempts have been made to counter these forces. U.S. Pat. No. 3,811,528, issued to Hooper, exemplified some of these attempts. Hooper described a technique to that was used to mount a 180 degree twin engine. These engines have certain complications in attenuating vibration energy because the engines have two cylinders operating in the same plane with a phase difference of 180 degrees. Thus, the engine operation is accompanied by forces that are coupled, which forces cause an oscillation of the engine. Hooper determined that placing engine mountings at a particular location could balance the stiffness moments. The engine mountings were disclosed to be stiffer in an axial direction than in circumferential directions about the axis of oscillation.

SUMMARY OF THE INVENTION

Even the construction in Hooper, however, failed to adequately compensate for the diverse forces and vibrations set up by operation of the engine. Hooper's engine mounts provided increased damping in shear and increased support in compression; however, Hooper's triangulated mount placement was difficult for manufacturing reasons and failed to adequately support the engine unit. Accordingly, an improved engine mounting arrangement is desired.

One aspect of the present invention involves a small vehicle comprising a frame assembly with at least one wheel supporting the frame assembly. The frame assembly comprises a pair of bottom rails that are laterally spaced from each other and a transverse generally horizontal plane extending through a centerline of each of the bottom rails. An engine compartment is defined above the transverse generally horizontal plane. An engine is disposed within the frame assembly with the engine being drivingly connected to the at least one wheel. The engine comprises a crankshaft having an axis of rotation and a center of gravity. The engine further comprises a first mounting side and a second mounting side. The first mounting side and the second mounting side extend generally parallel to the axis of crankshaft rotation. A first engine mount and a second engine mount are spaced from each other and are secured to the first mounting side of the engine. A third engine mount and a fourth engine mount are spaced from each other and are secured to the second mounting side of the engine. Each of the first engine mount, the second engine mount, the third engine mount and the fourth engine mount comprises a pair of plates that are spaced by a resilient material. The resilient material is more compliant in a shear direction than in a direction normal to the shear direction. A first plane is defined through the direction normal to the shear direction of the first engine mount and the first mounting side. A second plane is defined through the direction normal to the shear direction of the second engine mount and the second mounting side. The first plane and the second plane intersect at the center of gravity.

Another aspect of the present invention involves a small vehicle comprising a frame assembly with an engine mounted to the frame assembly. The engine comprises a transversely extending crankshaft. A front engine mount is disposed between the engine and the frame assembly and a rear engine mount is disposed between the engine and the frame assembly. The front engine mount and the rear engine mount both comprise a pair of plates that are separated by a block of elastomeric material. The block of elastomeric material is seven times stiffer in compression than in shear. The front engine mount is disposed on a first imaginary transverse cylinder centered at a center of gravity of the engine and the rear engine mount is disposed on a second imaginary transverse cylinder centered at the center of gravity of the engine. The front engine mount has a shear direction that is tangential to the first cylinder and a compression direction that is normal to the shear direction while the rear engine mount has a shear direction that is tangential to the second cylinder and a compression direction that is normal to the shear direction such that a compression direction of each engine mount extends through a transverse axis intersecting the center of gravity.

A further aspect of the present invention involves a small vehicle comprising a frame assembly with an engine mounted to the frame assembly. The engine comprises a transversely extending crankshaft. A first pair of engine mounts and a second pair of engine mounts are disposed between the engine and the frame assembly. The first pair of engine mounts comprises a first front engine mount and a first rear engine mount and the second pair of engine mounts comprises a second front engine mount and a second rear engine mount. Each of the engine mounts comprises a pair of plates that are separated by a block of elastomeric material. The block of elastomeric material is seven times stiffer in compression than in shear. The first pair of engine mounts and the second pair of engine mounts being laterally separated by a longitudinally extending center plane that substantially bisects the vehicle. The first pair of engine mounts is disposed on a pair of hypothetical cylinders centered along an axis extending through a center of gravity of the engine in a direction parallel to an axis of crankshaft rotation and the second pair of engine mounts also is disposed on the pair of hypothetical cylinders.

BRIEF DESCRIPTION OF THE DRAWINGS

These and other features, aspects and advantages of the present invention will now be described with reference to the drawings of a preferred embodiment, which preferred embodiment is intended to illustrate and not to limit the invention. The drawings comprise five figures.

DETAILED DESCRIPTION OF THE PREFERRED EMBODIMENT

With initial reference to FIGS. 1 and 2, a vehicle 10 that comprises an engine mounting system and engine mounts arranged and configured in accordance with certain features, aspects and advantages of the present invention will be described. The illustrated vehicle 10 is a four-wheeled utilitarian or recreational vehicle. More particularly, the illustrated vehicle 10 is a four-wheeled all terrain vehicle. In some applications, the vehicle 10 can have other numbers of wheels. For instance, the vehicle can have as few as one wheel or more than four wheels, depending upon the desired application. In addition, certain features, aspects and advantages of the present invention can be used with tracked vehicles, such as snowmobiles, for instance. Furthermore, certain features, aspects and advantages of the present invention can be used with water vehicles, such as personal watercraft, for instance but without limitation. Accordingly, the illustrated vehicle 10 simply provides one environment in which certain features, aspects and advantages of the present invention can be used.

Figure 3:
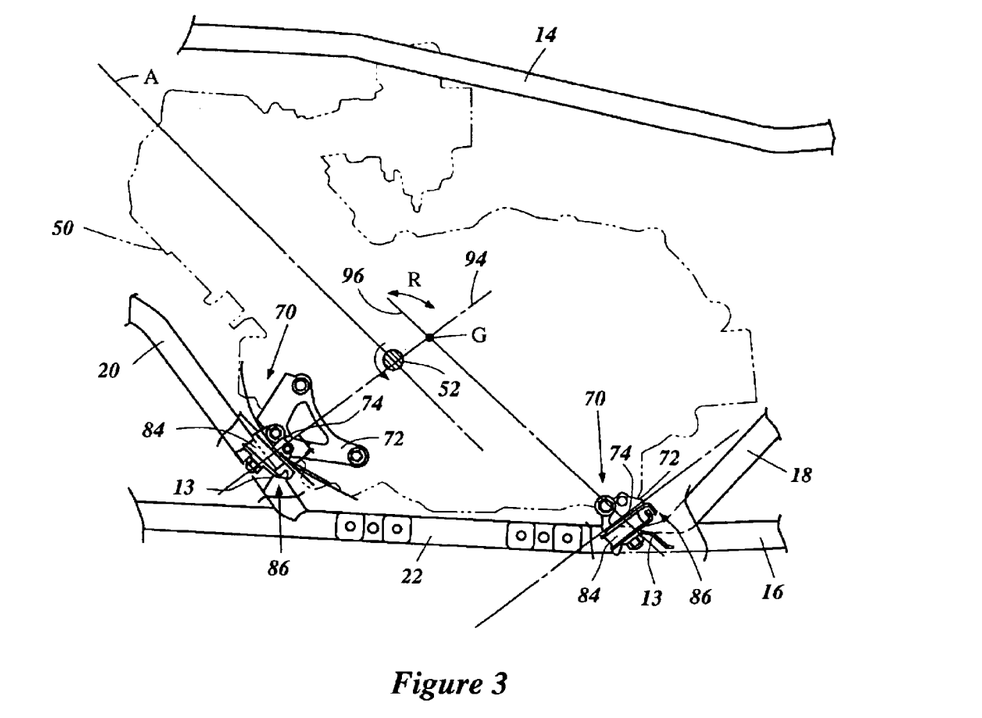
FIG. 3 is an enlarged side elevation view of a portion of the vehicle of FIG. 1 and the engine mounting arrangement.
Figure 4:
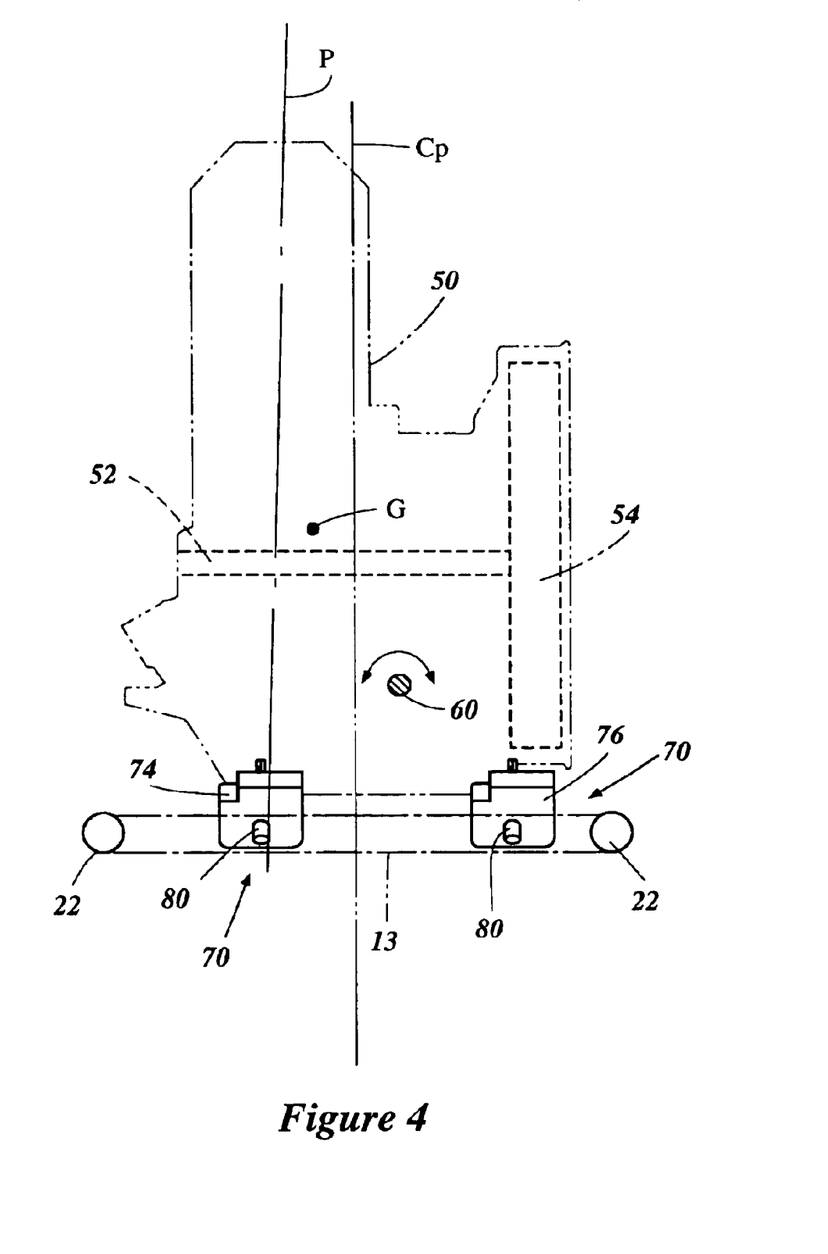
FIG. 4 is an enlarged rear elevation view of the portion of the vehicle and the engine mounting arrangement shown in FIG. 3.

The illustrated vehicle 10 generally comprises a welded-up frame assembly 12 (see FIGS. 3 and 4). Any suitable frame assembly 12 can be used. The illustrated frame assembly 12 generally comprises a pair of substantially parallel subassemblies that are laterally spaced from each other and secured together with a number of cross members 13.

The subassemblies each generally comprise a main tube 14 that extends rearward from a head tube (not shown). The main tubes 14 in the illustrated arrangement extend rearward and are supported by pillar tubes 16 proximate a rear portion of the main tubes 14 and down tubes 18 at a location forward of the pillar tubes 16. Suitable bracing members can be provided in strategic locations to reinforce the subassemblies. Bottom rails 22 extend a majority of the length of each subassembly and are connected to a lower portion of the respective pillar tubes 16 and down tubes 18. A plane that extends through both bottom rails 22 extends in a generally horizontal direction. A forward tube 20 extends upward from a forward portion of the bottom rails 22 and provides support to the front portion of the frame as well as provides an engine mounting location, which will be described in more detail below.

The frame assembly 12 is supported by ground engaging elements, such as a group of wheels in the illustrated arrangement. The ground engaging elements also can comprise runners, skis, drive belts and the like, depending upon the application. The illustrated vehicle comprises a pair of front wheels 24 and a pair of rear wheels 26 that support the frame assembly 12 in a known manner. In general, the wheels 24, 26 are connected to the frame assembly 12 using any suitable suspension system.

The frame assembly 12 supports a body assemblage. The body assemblage comprises a number of components that are generally known to those of ordinary skill in the art. These components are attached to the frame assembly 12 in any suitable manner, including those generally known to those of ordinary skill in the art.

The body assemblage comprises a front fender assembly 28 and a rear fender assembly 30. The fender assemblies 28, 30 generally comprise members that extend over the respective wheels 24, 26 and, in some arrangements, intermediate members that span the distance between the wheel covering members. These members can be integrated into a single component or can be formed of distinct components.

The body assemblage also comprises a front carrying rack 32 and a rear carrying rack 34. These racks 32, 34 are supported above a portion of the respective fender assemblies 28, 30 in any suitable manner. In some configurations, the racks 32, 34 are supported by the respective fender assemblies 28, 30.

Rearward of the front fender assembly 28, the body assemblage also comprises a gauge cluster 36. The gauge cluster 36 comprises a number of vehicle operating condition indicators, such as are known in the art. The gauge cluster 36 can be integrated into the front fender assembly 28 in some configurations.

Rearward of the illustrated gauge cluster, the body assemblage preferably comprises a fuel tank 38 and a seat 40. The fuel tank 38 can be an actual fuel tank or can be a hollowed shell component that is designed to resemble a fuel tank while providing a recess into which an air intake can extend. In such arrangements, the actual fuel tank 38 can be positioned below the seat 40.

Forward of the fuel tank 38 and rearward of the gauge cluster in the illustrated arrangement, the vehicle 10 comprises a handlebar assembly 42. The handlebar assembly 42 preferably comprises a pair of handgrips 44 that are mounted in a manner to allow an operator holding the grips 44 to pivot a steering column 46. The steering column 46 effects steering movement of the front wheels 24 through any suitable linkage.

In the illustrated arrangement, a pair of foot boards 48 are mounted to the frame assembly 12, with one foot board 48 being positioned on each lateral side of the frame assembly 12. In some arrangements, the foot boards 48 can be replaced by foot pegs, nerf bars. Other suitable foot support arrangements also can be used.

Figure 1:
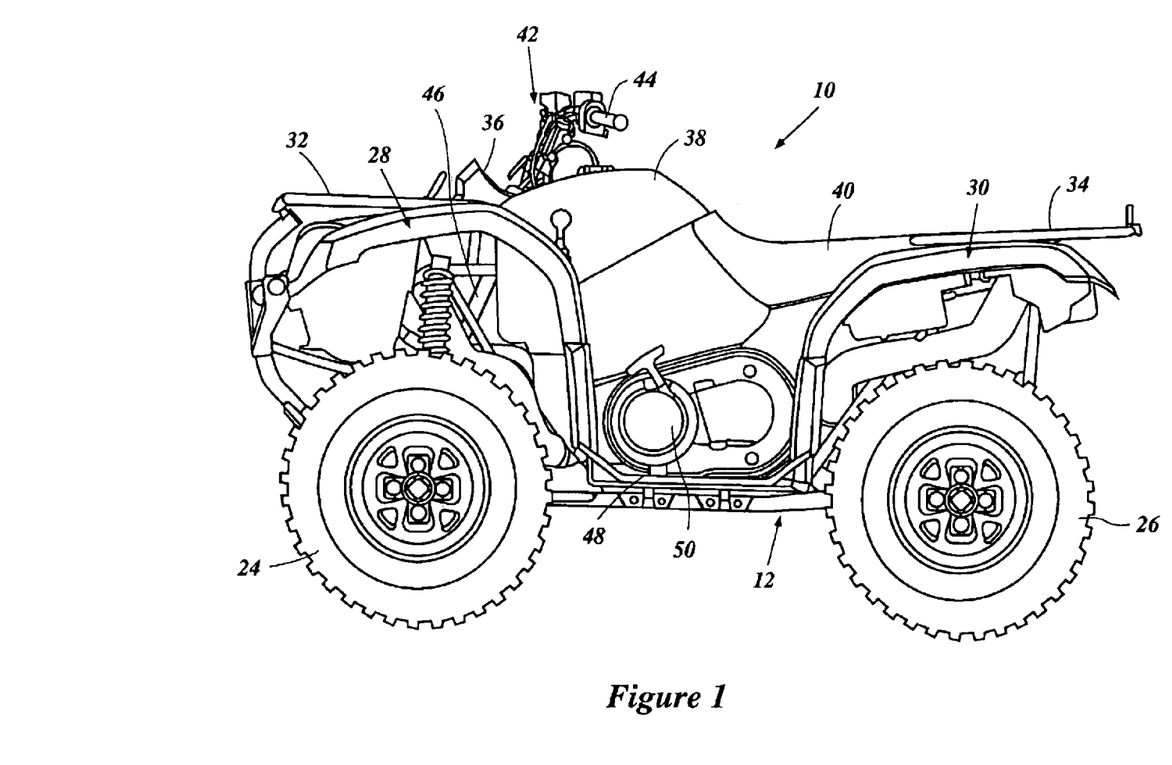
FIG. 1 is a side elevation view of a vehicle having an engine mounting arrangement that is configured in accordance with certain features, aspects and advantages of the present invention.
Figure 2:
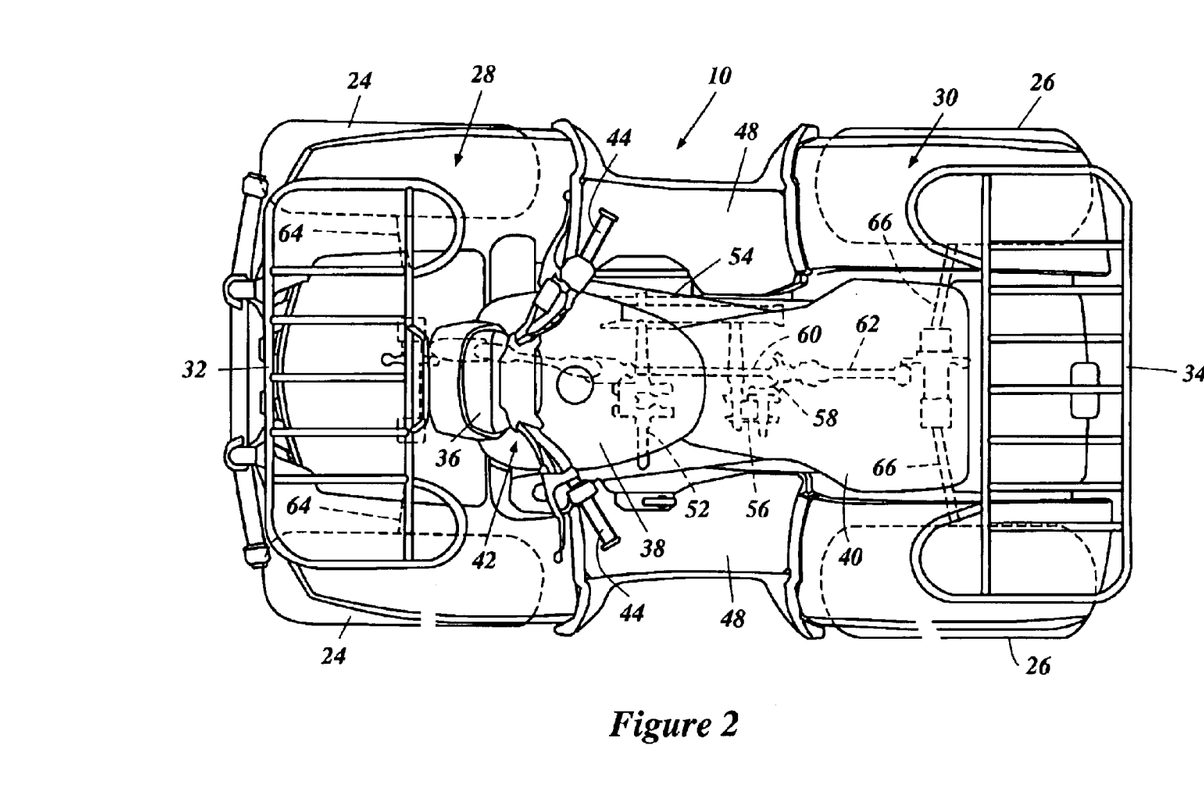
FIG. 2 is a top plan view of the vehicle of FIG. 1 showing a portion of a drive system with hidden lines.

With reference to FIG. 1, an engine unit 50 is mounted to the frame assembly 12 at a location generally below the fuel tank 38 and the seat 40. The engine unit 50 can be of any suitable construction. In a preferred arrangement, the engine unit 50 comprises an internal combustion engine and a transmission that are combined into a single member. In some constructions, the engine and the transmission can be provided separately from each other (i.e., not integrated). In the combined arrangement, the engine unit 50 features a center of gravity G that is positioned midway between the engine and the transmission.

The engine unit 50 can have any desired orientation. In the illustrated arrangement, as shown in the simplified view of FIG. 2, the engine unit 50 comprises a transversely extending crankshaft 52. Preferably, the illustrated engine unit 50 is a single cylinder construction; however, more than one cylinder can be used in other arrangements.

The crankshaft 52 preferably drives a suitable continuously variable transmission (CVT) 54. More preferably, the crankshaft drives a belt-type CVT 54. Other suitable CVT constructions also can be used. In addition, arrangements not using a CVT can be implemented. Due to the use of a belt-type CVT 54, the center of gravity G is positioned closer to a generally longitudinal plane P that extends through an axis A of a piston of the engine unit 50.

The CVT 54 preferably drives a change speed transmission 56. The change speed transmission 56 more preferably provides a low, high, neutral and reverse gearing. In some configurations, the change speed transmission 56 also features a park lock position such that movement of the vehicle can be precluded by a construction positioned within the change speed transmission. As the operator operates the vehicle 10, the operator can shift gears among low, high, neutral and reverse depending upon the desired operating characteristics.

The illustrated change speed transmission 56 features an output shaft. The output shaft can power the vehicle by connections provided within a transfer case (not shown). In some arrangements, the transfer case can be integrated into the engine unit 50, which also includes a gear box that contains the change speed transmission. For instance, the transfer case can contain a bevel gear 58 that is connected to a front drive shaft 60 and a rear drive shaft 62. Preferably, the front drive shaft 60 can be selectively coupled and decoupled from the drive train to switch operation between four wheel drive and two wheel drive. The front drive shaft 60 is connected to a pair of front half shafts 64 and the rear drive shaft is connected to a pair of rear half shafts 66. Preferably, the half shafts 64, 66 are connected to the respective drive shafts 60, 62 with suitable constant velocity joints (CV joints). The half shafts 64, 66 drive the respective wheels 24, 24.

With reference now to FIGS. 3 and 4, the engine unit 50 preferably is mounted to the frame assembly 12 through the use of a number of engine mounts 70. In the illustrated arrangement, four engine mounts 70 are used to cradle the engine unit 50 relative to the frame assembly. Desirably, these engine mounts 70 are strategically located. As will be described, the illustrated arrangement effectively supports the engine unit 50 within an engine compartment defined by the frame assembly 12. In some arrangements, the engine and the transmission may be formed separately (i.e., not rigidly connected to each other) and mounts 70 can support the engine, the transmission or both individually.

Preferably, the engine body 50 is provided with brackets 72 to which the engine mounts 70 are attached. The brackets 72 can be attached to the engine body 50 in any suitable manner. In the illustrated arrangement, the brackets are separately formed and are attached to the engine body 50 with threaded fasteners, such as bolts. In some arrangements, the brackets can be integrally formed with the engine unit 50. In other arrangements, the brackets can be welded to the engine unit 50 or otherwise permanently affixed to the engine. In yet other arrangements, suitable mechanical interlocks can be used to secure the components together.

Figure 5:
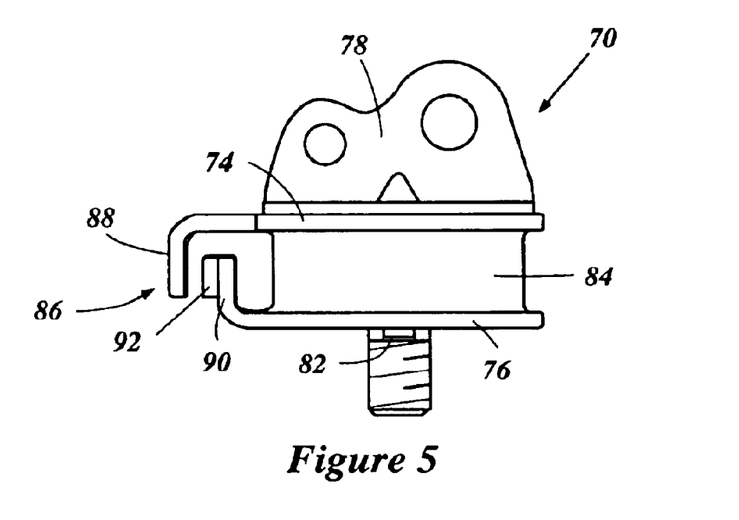
FIGS. 5 and 6 are enlarged views of engine mounts used in the engine mounting arrangement shown in FIGS. 3 and 4.
Figure 6:
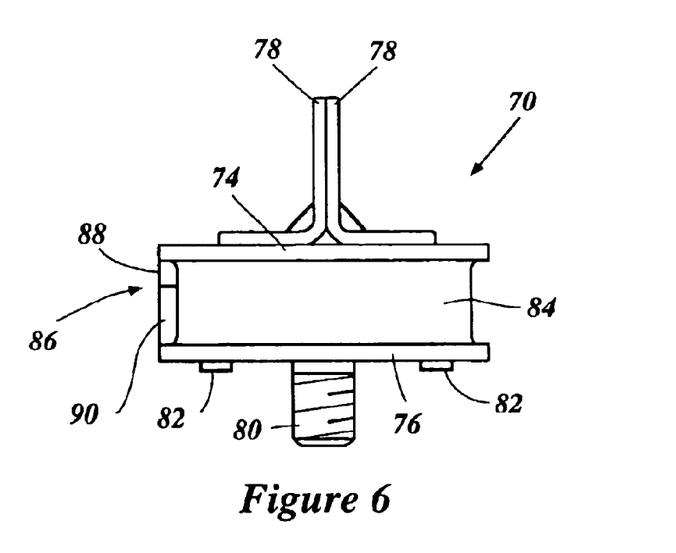

With reference to FIGS. 5 and 6, the illustrated engine mounts 70 comprise a first plate 74 and a second plate 76. The first plate 74 and the second plate 76 are spaced from each other and arranged generally parallel to each other. A pair of mounting ears 78 extend from one of the plates 74, 76 while a lug 80 extends from the other of the plates 74, 76.

The mounting ears 78 preferably extend upward from the first plate 74. In the illustrated arrangement, two mounting ears 78 are placed back-to-back for improving the strength of the mounting ears 78. The mounting ears 78 have an upright portion that extends along a generally longitudinal plane when installed. Threaded fasteners preferably are used to secure the mounting ears 78 to the brackets 72. Other suitable mounting arrangements also can be used.

The lug 80 preferably is a short threaded round. In one arrangement, the lug 80 is formed of a threaded rod. The lug 80 preferably is designed to extend through one of the cross members 13 to secure the engine and the engine mounts 70 in position relative to the frame assembly 12. Accordingly, the lugs 80 should be appropriately sized and the material should be appropriately selected. Such sizing and material selection, however, can be readily performed by one of ordinary skill in the art depending upon the application. By using the lugs 80, the engine mounts 70 can be placed between the bottom rails 22 on the cross members 13 and the engine mounts 70 overlap with the bottom rails 22 in side view (see FIG. 3). In other words, the generally horizontal plane that extends through the bottom rails intersects at least some of the engine mounts 70.

A pair of locator pins 82 also are provided in the illustrated arrangement. The locator pins 82 extend from the same surface of the second plate 76 as the lug 80. The locator pins 82 facilitate assembly of the vehicle 10 by providing positive feedback regarding orientation of the engine mounts 70. In addition, the pins 82 reduce the likelihood of rotation of the engine mounts 70 relative to the frame assembly 12 during manufacture or operation. In some arrangements, recesses can be formed with the pins extending from the frame assembly; however, the illustrated arrangement is preferable from a manufacturability standpoint.

With continued reference to FIGS. 5 and 6, the plates 74, 76 are spaced by a block 84 of resilient material. The block 84 of material can have any of a number of shapes. For instance, in viewing the plates 74, 76 on an end, the block 84 can have a circular, triangular, rectangular, square, parallelogram cross-section. Preferably, the block 84 is a rectangular parallelepiped which results in improved vibration damping in shear.

The block 84 of material can be secured to the plates 74, 76 in any suitable manner. In one arrangement, the block 84 is bonded to the plates 74, 76. Preferably, the material is elastomeric. More preferably, the material is selected such that the material has differing spring rates in shear and in compression/tension. Even more preferably, the material is selected such that the material is about seven times stiffer in compression and tension than the material is in shear. In some arrangements, the material can be between about three and ten times stiffer in this direction. Any number of materials can be used or combined to result in such properties.

The illustrated plates 74, 76 also are provided with a positive stop construction 86. The positive stop construction 86 preferably is positioned along an end of the engine mount 72 that will extend in a transverse direction when installed on the vehicle 10. In the illustrated arrangement, the positive stop construction 86 extends generally transverse to the mounting ears 78. The positive stop construction 86 can comprise a downwardly extending lip 88 and an upwardly extending lip 90. A buffer material 92, such as an elastomeric material, is provided between the two lips 88, 90. The buffer material 92 preferably is selected to cushion any contact that may occur between the lips 88, 90. In some arrangements, the lips 88, 90 can be secured together with buffer material 92 such that movement of the engine unit 50 will attempt to separate the lips 88, 90 against the restraint of the buffer material 92.

With reference again to FIGS. 3 and 4, the mounts 70 preferably are strategically positioned and oriented relative to the frame assembly 12 and the engine unit 50. The mounts 70 preferably are paired into a left pair and a right pair with each pair having a front mount and a rear mount. A longitudinal center plane CP preferably extends between the left pair and the right pair. The center plane preferably substantially bisects the vehicle. More preferably, the driveshaft 60 extends between the left pair and the right pair. In addition, the crankshaft 52 preferably is positioned between the front mount and the rear mount of each pair.

By placing the mounts under a forward and rearward portion of the engine, fore and aft rolling of the engine can be absorbed by the front and rear mounts 70. In addition, by placing the mounts to each side of the engine unit 50, side to side movement of the engine can be absorbed. Due to the selection of a material that is seven times stiffer in compression and tension than in shear, fore and aft movement of the engine unit 50 is effectively restricted because such movement places the engine mounts 70 under tension and/or compression. Fore and aft movement is often encountered as a reaction force R when the engine speed is rapidly accelerated. In particular, when the engine speed is rapidly accelerated, the illustrated crankshaft 52 rotates counterclockwise in FIG. 3 and the engine unit 50 attempts to rotate clockwise due to reaction forces.

To restrict such fore and aft movement even more, the engine mounts 70 preferably are positioned relative to a center of gravity of the engine unit 50. This center of gravity preferably relates to all components that are affixed to the engine unit 50. For instance, if a gear box is integrated with the engine in forming the engine unit, the center of gravity relates to the engine and the gear box so long as both are being supported by the engine mounts 70. In the illustrated arrangement, the engine mounts 70 are positioned with a shear direction extending tangentially to a cylinder 98, 100 that extends through the center of gravity along an axis that parallels a rotational axis of the crankshaft 52. Thus, the compression and tension direction of the engine mounts 70 effectively becomes a radial line 94, 96 of the hypothetical cylinders 98, 100. In the illustrated arrangement, two coaxial cylinders 98, 100 define the locations of the mounts with the front mounts 70 being positioned on a cylinder 98 having a smaller radius than the cylinder 100 on which the rear mounts 70 are positioned. The compression directions effectively intersect at the center of gravity in the illustrated arrangement with an include angle of between about 70 degrees and about 120 degrees being defined by the intersection. In one arrangement, similar to the illustrated arrangement, the included angle is approximately 90 degrees. An intersection angle within this range is believed to reduce most of the fore and aft rolling of the engine while providing adequate support for the cradled engine unit 50.

The reactive rotation of the engine unit 50 is further limited by the positive stop construction 86. The illustrated positive stop construction 86 is mounted to a rearward side of each mount 70 such that clockwise rotation of the engine unit 50 would tend to close the positive stop construction 86 and the rotation of the engine unit 50 would be stopped by the positive stop construction 86. In arrangements featuring a longitudinally oriented crankshaft, the positive stop construction 86 preferably is located on the side of each mount 70 that corresponds to the side of the crankshaft showing upward movement (i.e., right side in FIG. 3). In other words, the positive stop construction 86 is placed on the side that is compressed by rotational reaction forces of the engine unit 50 around the center of gravity G during rapid acceleration. Such a placement allows the positive stop construction to restrict reactive movement of the engine during rapid acceleration. In one construction, the positive stop construction 86 can limit engine displacement by limiting movement of the two plates toward each other. In another construction, the positive stop construction 86 can limit engine displacement by limiting movement of the two plates away from each other.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Also, many features of the present invention individually contribute to reduction of engine movement and absorption of vibration energy; not all features need be present in any single embodiment of a construction using other features of the present invention. Accordingly, the scope of the present invention is intended to be defined only by the claims that follow.

What is claimed is:

1. A small vehicle comprising:
  a frame assembly, at least one wheel supporting the frame assembly, said frame assembly comprising a pair of bottom rails that are laterally spaced from each other and a transverse generally horizontal plane extending through a centerline of each of said bottom rails, an engine compartment being defined above said transverse generally horizontal plane;
  an engine disposed within the frame assembly, the engine being drivingly connected to said at least one wheel, said engine comprising a crankshaft having an axis of rotation and a center of gravity, said engine further comprising a first mounting side and a second mounting side, said first mounting side and said second mounting side extending generally parallel to said axis of crankshaft rotation;
  a first engine mount and a second engine mount being spaced from each other and being secured to said first mounting side of said engine, a third engine mount and a fourth engine mount being spaced from each other and being secured to said second mounting side of said engine;

each of said first engine mount, said second engine mount, said third engine mount and said fourth engine mount comprising a pair of plates that are spaced by a resilient material, said resilient material being more compliant in a shear direction than in a direction normal to said shear direction;

and a first plane being defined through said direction normal to said shear direction of said first engine mount and said first mounting side, a second plane being defined through said direction normal to said shear direction of said second engine mount and said second mounting side, said first plane and said second plane intersecting at said center of gravity.

2. The vehicle of claim 1, wherein an included angle defined between said first plane and said second plane is between about 70 degrees and about 120 degrees.

3. The vehicle of claim 1, wherein at least one of said first engine mount, said second engine mount, said third engine mount and said fourth engine mount is intersected by said transverse generally horizontal plane.

4. The vehicle of claim 1, wherein said first engine mount, said second engine mount, said third engine mount and said fourth engine mount are disposed between said bottom rails.

5. The vehicle of claim 4, wherein said third engine mount and said fourth engine mount are intersected by said transverse generally horizontal plane.

6. The vehicle of claim 1, wherein said first engine mount and said second engine mount are disposed at a first angle relative to said transverse generally horizontal plane and said third engine mount and said fourth engine mount are disposed at a second angle relative to said transverse generally horizontal plane.

7. The vehicle of claim 1, wherein each of said engine mounts comprise a positive stop construction that is disposed on a side of said engine mount that is compressed by a reaction force to crankshaft rotation.

8. The vehicle of claim 1, wherein each of said engine mounts comprise a positive stop construction to limit displacement of said engine by a reaction force to crankshaft rotation.

9. A small vehicle comprising a frame assembly, an engine mounted to the frame assembly, the engine comprising a transversely extending crankshaft, a front engine mount disposed between said engine and said frame assembly, a rear engine mount disposed between said engine and said frame assembly, said front engine mount and said rear engine mount both comprising a pair of plates that are separated by a block of elastomeric material, said block of elastomeric material being seven times stiffer in compression than in shear, said front engine mount being disposed on a first imaginary transverse cylinder centered at a center of gravity of said engine and said rear engine mount being disposed on a second imaginary transverse cylinder centered at said center of gravity of said engine, said front engine mount having a shear direction that is tangential to said first cylinder and a compression direction that is normal to said shear direction, said rear engine mount having a shear direction that is tangential to said second cylinder and a compression direction that is normal to said shear direction such that a compression direction of each engine mount extends through a transverse axis intersecting said center of gravity.

10. The vehicle of claim 9, wherein said front engine mount and said rear engine mount are disposed inward of a pair of lower frame rails.

11. The vehicle of claim 9, wherein said block comprises a rectangular parallelepiped.

12. The vehicle of claim 9, wherein said first cylinder has a smaller diameter than said second cylinder.

13. The vehicle of claim 9, wherein said crankshaft rotates in a first direction and said engine mounts comprises means to positively limit engine rotation about said center of gravity in a direction opposite to said first direction.

14. The vehicle of claim 13, wherein said means comprises a pair of spaced lips that are brought together by rotation of said engine about said center of gravity in a direction opposite to said first direction.

15. The vehicle of claim 14, wherein said means further comprises a resilient material disposed between said spaced lips.

16. The vehicle of claim 9 further comprising a second front engine mount and a second rear engine mount, said second front engine mount being disposed along said first cylinder and said second rear engine mount being disposed along said second cylinder.

17. The vehicle of claim 16, wherein said second front engine mount has a shear direction that is tangential to said first cylinder and a compression direction that is normal to said shear direction, said second rear engine mount has a shear direction that is tangential to said second cylinder and a compression direction that is normal to said shear direction, said compression directions of said front engine mount and said second front engine mount extend in a common direction and said compression directions of said rear engine mount and said second rear engine mount extend in a second common direction.

18. The vehicle of claim 9 further comprising a driveshaft assembly that extends in a longitudinal direction.

19. The vehicle of claim 18 further comprising a bevel gear connected to said driveshaft assembly.

20. The vehicle of claim 19, wherein said driveshaft assembly comprises a front and a rear driveshaft.

21. A small vehicle comprising a frame assembly, an engine mounted to the frame assembly, the engine comprising a transversely extending crankshaft, a first pair of engine mounts and a second pair of engine mounts being disposed between said engine and said frame assembly, said first pair of engine mounts comprising a first front engine mount and a first rear engine mount, said second pair of engine mounts comprising a second front engine mount and a second rear engine mount, each of said engine mounts comprising a pair of plates that are separated by a block of elastomeric material, said block of elastomeric material being seven times stiffer in compression than in shear, said first pair of engine mounts and said second pair of engine mounts being laterally separated by a longitudinally extending center plane that substantially bisects said vehicle, said first pair of engine mounts being disposed on a pair of hypothetical cylinders centered along an axis extending through a center of gravity of said engine in a direction parallel to an axis of crankshaft rotation and said second pair of engine mounts also being disposed on said pair of hypothetical cylinders.

22. The vehicle of claim 21 further comprising a driveshaft that extends between said first pair of engine mounts and said second pair of engine mounts.

23. The vehicle of claim 21, wherein said front engine mount of both pairs of engine mounts is disposed on a cylinder of said pair of cylinders having a smaller diameter.

24. The vehicle of claim 21 further comprising a longitudinally-extending driveshaft assembly.

25. The vehicle of claim 24 further comprising a bevel gear connected to said driveshaft assembly.

26. The vehicle of claim 25, wherein said driveshaft assembly comprises a front and rear driveshaft.

* * * * *

UNITED STATES PATENT AND TRADEMARK OFFICE
CERTIFICATE OF CORRECTION

| | | |
|---|---|---|
| PATENT NO. | : 6,823,960 B2 | Page 1 of 2 |
| APPLICATION NO. | : 10/119439 | |
| DATED | : November 30, 2004 | |
| INVENTOR(S) | : Shimizu et al. | |

It is certified that error appears in the above-identified patent and that said Letters Patent is hereby corrected as shown below:

Replace Figure 3 with the enclosed corrected Figure 3. As shown on the attached page.

Signed and Sealed this

Twelfth Day of February, 2008

JON W. DUDAS
*Director of the United States Patent and Trademark Office*

*Figure 3*